May 1, 1945.  W. UMBDENSTOCK  2,375,052
MILLING AND GRINDING MACHINE
Filed Sept. 5, 1942  2 Sheets-Sheet 1
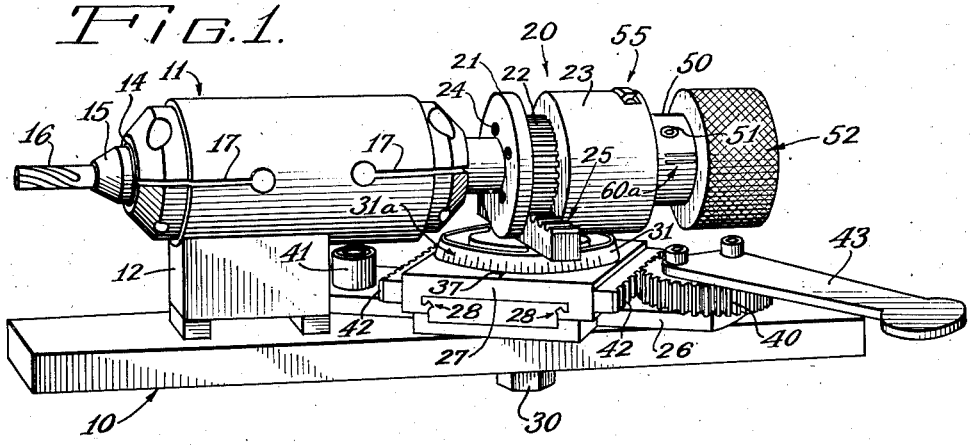
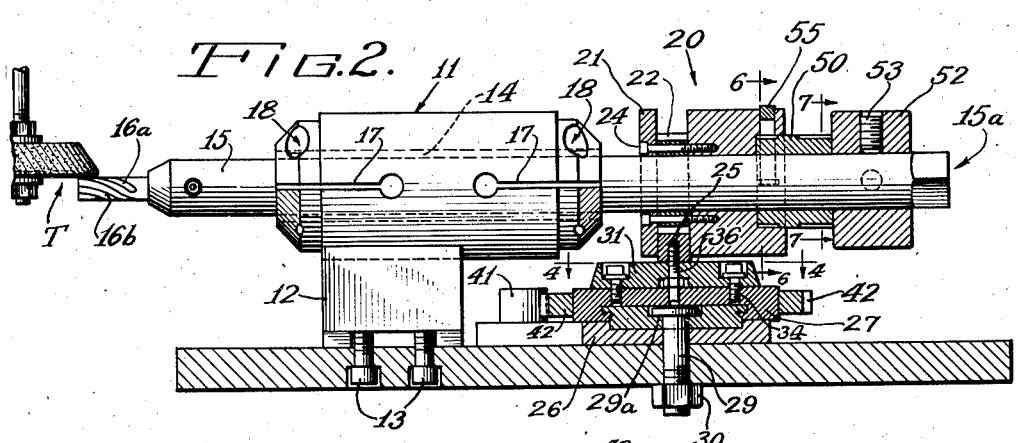
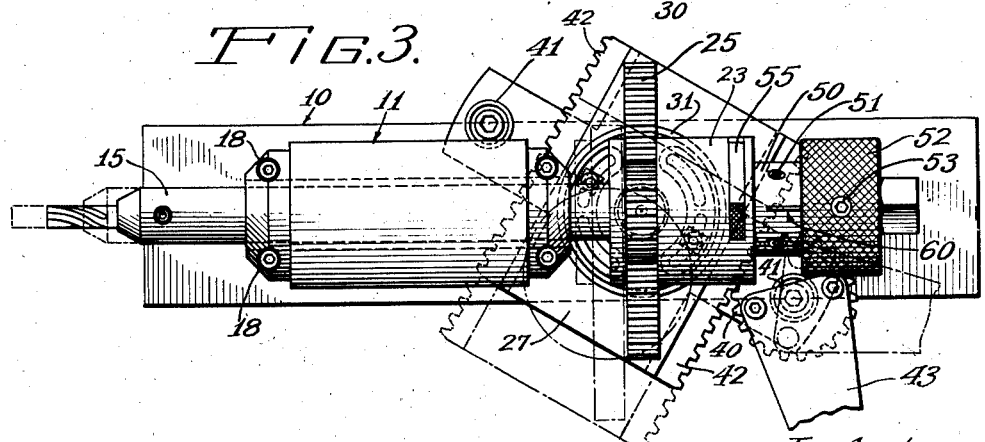
Inventor:
Walter Umbdenstock
By
Attorney May 1, 1945.  W. UMBDENSTOCK  2,375,052
MILLING AND GRINDING MACHINE
Filed Sept. 5, 1942  2 Sheets-Sheet 2
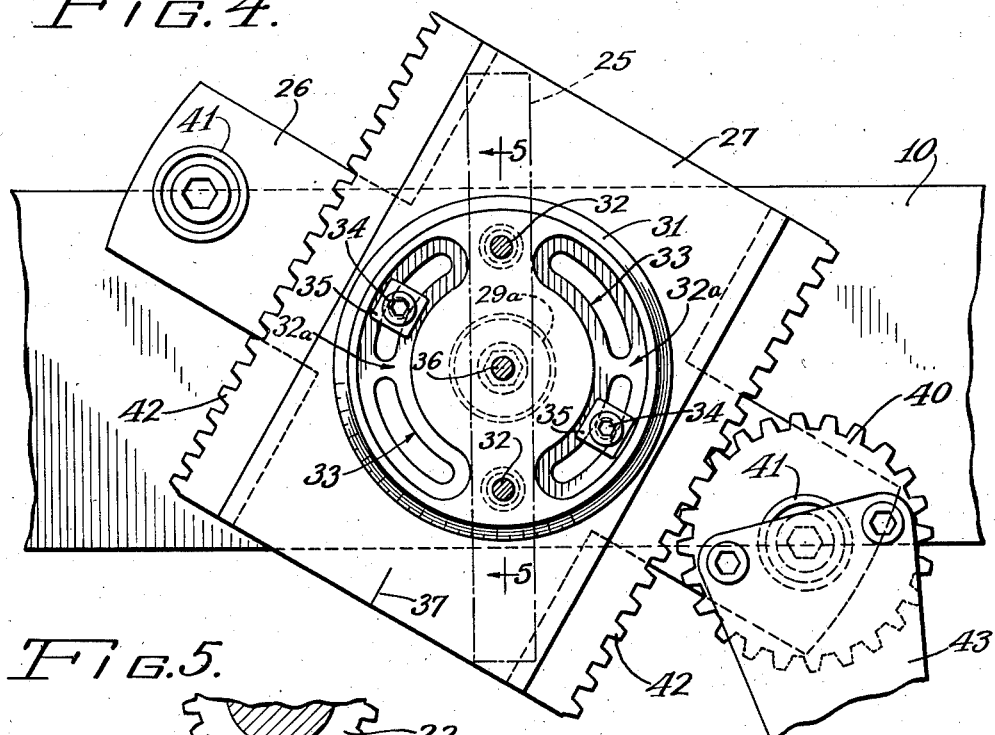
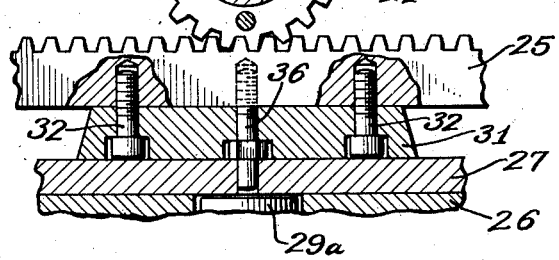
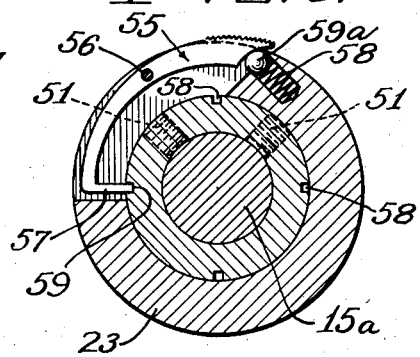
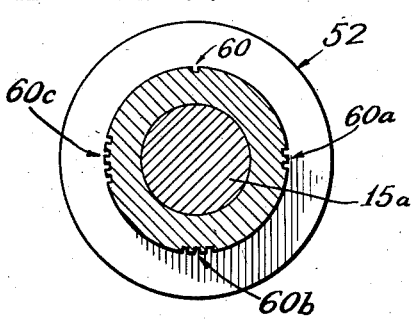
Inventor:
Walter Umbdenstock
By
Attorney Patented May 1, 1945

2,375,052

UNITED STATES PATENT OFFICE 2,375,052

MILLING AND GRINDING MACHINE

Walter Umbdenstock, Chicago, Ill., assignor to Raymond T. Moloney, Chicago, Ill.

Application September 5, 1942, Serial No. 457,390

5 Claims. (Cl. 51—225)

This invention pertains to metal working machines and the like, and more particularly to milling and grinding machines.

The principal object of the invention is the provision of a small, precision-quality machine for use in grinding, cutting, or shaping various tools, cams, gears, worms, and the like, and which is so constructed and arranged as to guide the work or stock in a complex rotative and linear motion with respect to a grinding, cutting, or other tool.

Viewed from another aspect, it is an object to provide a compact and relatively inexpensive machine for use in cutting and grinding operations wherein the work must be accurately moved with respect to a tool at various angles of lead and pitch such as, for example, spiral and analogous complex motions encountered in making various kinds of worms, cams, end mills, and special tools.

It is a further object to provide a machine of the class described including a chuck or work holder which is given simultaneous axial and angular displacement of predetermined degree; to provide a simple mechanism in the nature of coacting planetary and angular displacement means for imparting dual motion to the chuck so as to shift the same angularly as well as linearly; to provide means for adjusting the planetary and angular displacement means; to provide a simple manual index means for indicating the operations performed on the work; and to provide a device of the class described which shall be of general utility and flexibility such that it will serve in place of larger, more expensive and complicated gear cutting, milling, and similar grinding machines.

Other objects and aspects of utility and novelty reside in certain details of construction and operation of the illustrative embodiment described hereinafter in view of the annexed drawings in which:

Fig. 1 is a perspective view of the novel machine;

Fig. 2 is a side elevation of the machine with parts shown in section;

Fig. 3 is a top plan view of the machine shown in Fig. 2;

Fig. 4 is a top plan view to enlarged scale of the planetary displacement means;

Fig. 5 is a section of the adjustable rack mounting means as viewed along lines 5—5 of Fig. 4;

Fig. 6 is a cross section of the manual registering or indexing means taken along lines 6—6 of Fig. 2;

Fig. 7 is another sectional view of the indexing means looking in the direction of lines 7—7 of Fig. 2.

The general assembly shown in perspective in Fig. 1 includes a bed plate 10 adapted for mounting in the bed of a grinding or milling machine, or in a suitable bench vise. A head stock 11 is secured to a block 12, which in turn is secured to the bed plate by means such as bolts 13 (Fig. 2).

The headstock includes a bore in which is fitted a bearing sleeve 14, and an elongated chuck or work holder 15 is slidably disposed in the sleeve, and in the illustration holds an end mill 16. The headstock is split as at 17 and provided with lateral tensioning bolt means 18 (Fig. 3) for gripping the bearing sleeve, while spindle portions 15a of the chuck means extend to the left well beyond the headstock, as shown especially in Fig. 2.

Means for effecting complex axial and rotative motion of the chuck includes a flanged pinion 20 consisting of a narrow flange portion 21, a pinion or gear portion 22, and a wide flange portion 23.

As shown in Fig. 2, the foregoing parts 21, 22, 23 of the flanged pinion means are assembled by bolt means 24 extending through the small flange, the pinion, and threading into the wide flange 23.

Pinion 22 meshes with a rack 25 (Figs. 1 and 3) which is flanked by the flanges 21 and 23 and which is disposed for angular adjustment on a compound planetary carrier or table means consisting of a base plate 26 and a slidable table portion 27 having tongue and groove engagement 28 with the relatively stationary base plate portion 26.

The main table assembly comprising parts 26 and 27 is adjustably secured to the bed plate 10 by means of a bolt 29 (Fig. 2) having a headed part 29a seated flush in the movable table part and passing through the latter and the plates 27 and 10 for engagement with a holding nut 30.

The rack 25 is secured (Figs. 2 and 5) upon a calibrated swivel ring 31 by countersunk bolt means 32 passing from the underside of the ring up into the rack. As seen particularly in Fig. 4 the swivel ring 31 is milled out to provide opposite arcuate depressions 32a each of which is in turn provided with arcuate slots 33 overlying the top surface of the movable or sliding table portion, into which are threaded set screws 34, each provided with clamping washers 35.

By loosening set screws 34 the swivel ring and its rack may be rotated about a pin 36 (Figs. 2 and 5) which depends centrally from the ring into a receiving bore in the slidable table part. Thus, the angular displacement of the rack 25 with respect to an index reference mark 37 (Fig. 4) may be changed at will.

Means for effecting linear motion of the table includes a pinion 40 (Figs. 1 and 4) removably journaled on one or the other of two bearing or pivot posts 41 (Figs. 1, 3, 4) secured on the table base portion 26 on opposite sides of the movable table part or carrier.

Pinion 40 meshes with one or the other of two racks of gear teeth 42 formed on opposite longitudinal sides of the sliding table part, and a manipulating lever 43 is fixed to said driving pinion 40 for effecting oscillation of the latter and consequent reciprocation of the table part 27.

The slidable table portion 27 carries the rack 25 with it whenever pinion 40 is moved, and in consequence the flanged pinion 20 is rotatively moved, resulting in angular motion of the chuck. In addition, if the table assembly is pitched or set at an angle so as to slide obliquely or laterally with respect to the long axis of the chuck spindle, as in Fig. 1 for example, then complex motion results and the chuck will shift axially in the headstock sleeve, because rack 25 bears against one or the other flange portion 21 or 23, depending upon which direction the table goes.

The relative amounts of angular and linear displacement of the chuck depends upon the setting of the table assembly, as evidenced by the calibrations on ring 31 with respect to the index 37.

Where several operations are to be performed on a given piece of stock, the operations may be kept track of by tally or counting means in the form of an indicating collar 50 (Figs. 1, 2, 3, 6) fixed on the chuck spindle part 15a by means of set screws 51, along with a knurled turning collar or knob 52 similarly fixed on the spindle part by set screws 53.

Manual turning of the knurled collar 52 rotates the chuck spindle and the index collar 50, and the latter has a portion which extends axially (Fig. 2) into a bore in one end of the wide pinion flange 23.

Means for coupling the flanged pinion with the chuck spindle includes an indexing pawl 55 (Fig. 6 particularly; also Fig. 3) pivoted as at 56 in a slot in the wide pinion flange collar and having a finger portion 57 which locks into indexing slots 58 on the portion of the index collar which fits into the end of the wide pinion collar. Spring means 59 seated in the wide flange portion urges a bearing ball 59a against the underside of the pawl to cause the finger 57 thereof to press into the slots 58 in the indexing collar.

Indexing indicia in the form of tally marks 60, 61a, b, c (Fig. 7) are placed opposite each locking or coupling slot 58 at the opposite end of the indexing collar so as to be visible to the operator, who releases pawl 55 after each operation and turns knob 52 until the next appropriate tally mark 61, etc., appears uppermost.

Operation

Assuming an end mill 16 to be placed in chuck 15, the operator loosens nut 30 and set screws 34 and turns the calibrated rack ring until the table assembly lies at the desired angle, as may be indicated by calibrations 31a on ring 31 with respect to index 37, whereupon nut 30 and set screws 34 are tightened.

The table pinion 40 is placed on whichever bearing or pivot post 41 is most convenient to the manipulation of lever 43. The indexing pawl 55 is depressed to withdraw locking finger 57, and the index collar 50 is rotated by means of knob 52 until the first or single index mark 60 is uppermost. Pawl 55 is released so that finger 57 locks in one of the slots 58, whereupon the flanged pinion is coupled to the chuck, and the operator knows from the tally index mark 60 that the first operation is to be performed.

Assuming that there are a plurality of cutting spirals 16a, 16b, etc. (Fig. 2) to be ground, and that a suitable grinding tool T is properly positioned with respect to the work or end mill 16, the operator slowly moves the lever 43 and thereby moves the work with a complex motion which will be exactly accurate and of a pattern determined by the particular angular setting of the device selected by the operator; in the present example, the displacement would be intended to follow or correspond to the spirals 16a, b, etc.

As each spiral cutting edge is ground, the tally index is rotated to second, third, etc., position to rotate the chuck and present another one of the spirals 16a, b . . . in grinding position.

From the foregoing description it will appear that the novel mechanism is relatively simple in construction, as well as operation, and that it is unnecessary to provide different gear sets or master patterns or cam or the like in order to procure one or another combination of lead and pitch displacement of the chuck; and while only one example, namely, that of grinding an end mill 16, has been illustrated, it will be obvious to those skilled in the art that the chuck means 15 may be arranged to accommodate any work, including drill bits, cams, gears, and the like.

It will also be understood that the objects and advantages of the invention may be realized by modified constructions of the particular form of the device illustrated herein, and no limitations upon the scope of the invention are contemplated other than as may be specifically set forth in the appended claims.

Having thus described my invention, improvement, and discovery, what I claim as new and desire to protect by Letters Patent of the United States is:

1. A machine of the class described comprising: a bed, a table base pivotally mounted on said bed, a slidable table mounted on said base, a swivel ring pivoted on said table, an elongated rack mounted on said ring diametrically thereof, a work spindle mounted to slide axially and to rotate with its axis parallel to the plane of said slidable table and at an angle to the direction of sliding motion of the table, a pinion on said spindle meshing with said rack, flange means rotatable with said pinion and disposed on opposite sides of the rack to bear against the latter responsive to movements of said rack obliquely to said axis of the spindle by sliding action of said table in opposite directions, together with means for holding said table base and said swivel ring in positions of pivotal adjustment, and means for sliding said table.

2. The combination defined in claim 1 and further characterized in that said pinion and flange means floats on said spindle, and there is additionally provided an indexing member fixed on the spindle to rotate therewith and carrying tally indicia at angular intervals relative to the rotating axis of the spindle, and means constituting part of said flange means on one side of the rack for selectively coupling said pinion and indexing member in different angular relations with respect to said indicia.

3. The device shown and described and including a mounting 10, headstock 11 fixed thereon, chuck spindle 15 mounted to slide and rotate in said headstock, table base 26 on said mounting, table 27 slidably mounted on said mounting, means 28—30 for securing said base, swivel ring 31 pivoted on said table, rack 25 on said ring, means 34 adjustably holding said ring on the table, pinion 22 on said spindle and meshing with said rack, flange means 22—23 rotatable with said pinion and flanking said rack for imparting axial displacement to said spindle responsive to transverse motion of said rack, means 40—42 for sliding said table whereby to carry said rack transversely of the axis of said spindle, means 50—51—55—57—58 for selectively coupling said pinion with said spindle.

4. A device of the class described comprising a spindle mounted for both rotation and longitudinal displacement, a pinion rotatable with said spindle, a carrier mounted at one side of said spindle for reciprocation transversely of the latter, a rack on said carrier drivingly engaging said pinion, and said carrier being adjustable for movement of the same and the rack thereon obliquely of the spindle, said rack rotating the pinion and spindle responsive to movement of the carrier, and annular collar means on said pinion bearing against opposite sides of said rack for effecting longitudinal movement of the spindle responsive to oblique movements of the rack as aforesaid, means for reciprocating said carrier, said pinion being rotatable on said spindle, one of said annular collar means being releasably coupled with said spindle in a plurality of selectable positions of angular displacement on the latter, together with index means carried with the spindle distinguishing said positions of angular displacement one from another.

5. In a spiral grinding machine, a bed, a slideway mounted rotatably on said bed, a slide working in said slideway, a first rack mounted rotatably on said slide, means for securing said rack in desired angular positions, a second rack at a side of said slide, a second pinion on said slideway driving said second rack for moving the slide back and forth, a work holder shaft mounted for spiral movement on said bed above said slide, a first pinion rotatable with said shaft and meshing with said first rack, and annular members on said shaft at each side of said first rack for shifting said shaft axially responsive to inclined motion of said first rack obliquely of the shaft upon movement of said slide, whereby to impart spiral motion to the shaft.

WALTER UMBDENSTOCK.